United States Patent [19]

Hashimoto et al.

[11] Patent Number: 4,699,370
[45] Date of Patent: Oct. 13, 1987

[54] SHEET FEEDING APPARATUS FOR COORDINATE PLOTTER

[75] Inventors: Takeji Hashimoto, Kyoto; Minoru Murayama, Shiga, both of Japan

[73] Assignee: Dainippon Screen Seizo Kabushiki Kaisha, Kyoto, Japan

[21] Appl. No.: 825,274

[22] Filed: Feb. 3, 1986

Related U.S. Application Data

[62] Division of Ser. No. 647,990, Sep. 6, 1984, Pat. No. 4,635,365.

[30] Foreign Application Priority Data

Sep. 9, 1983 [JP] Japan .............................. 58-165118
Sep. 12, 1983 [JP] Japan .............................. 58-166576

[51] Int. Cl.⁴ ............................................ B65H 5/22
[52] U.S. Cl. ..................................... 271/98; 271/227; 83/412; 414/752

[58] Field of Search .................... 83/24, 22, 409, 412, 83/418, 419, 402, 281; 271/93, 227, 228, 265, 266, 103–106, 98; 414/752; 901/40, 46; 318/568 D, 592; 364/182

[56] References Cited

U.S. PATENT DOCUMENTS 4,287,459  9/1981  Dahlström ..................... 901/40 X
4,483,527 11/1984  Hashimoto et al. ............. 271/98

FOREIGN PATENT DOCUMENTS 103465  8/1979  Japan ................................. 271/93

Primary Examiner—E. R. Kazenske
Assistant Examiner—Hien H. Phan
Attorney, Agent, or Firm—Rosen, Dainow & Jacobs

[57] ABSTRACT

A single sheet is transported from a tray where sheets are stored to the table of a coordinate plotter by a movable device which lifts the sheet by suction from the tray and moves the attached sheet part way to a final position on the table. The sheet is released; the device retreats and then again lifts the same sheet by suction and transports the sheet to a final position on the table.

2 Claims, 11 Drawing Figures

SHEET FEEDING APPARATUS FOR COORDINATE PLOTTER

This is a division of application Ser. No. 647,990 filed Sept. 6, 1984 now U.S. Pat. No. 4,635,365.

BACKGROUND OF THE INVENTION

This invention relates to a coordinate plotter equipped with an automatic punching device which forms, through a sheet laid on a table of the coordinate plotter, one or more positioning holes with predetermined distances apart from an origin of the coordinate plotter so as to hold the sheet on the predetermined position, a method for feeding sheets such as photosensitive sheets, peel-off films or Kent paper sheets onto the table, and an apparatus for practicing the method.

In conventional laying-out and block copying works making use of coordinate plotters, a plurality of positioning holes were formed by a puncher at predetermined positions of end portions of a mask for multiple exposure or a base sheet for patching and layout work and an original picture sheet so that the mask or base sheet can be brought into exact registration with a desired position of the original picture sheet, the thus-punched mask or base sheet was stored in an unprocessed sheet tray of a sheet feeding and ejecting device, a pinned bar corresponding to the puncher was provided detachably at a predetermined position of an end portion of the drafting table of the coordinate plotter, and the mask or base sheet was positioned on the table by the pins of the pinned bar so as to coincide the relative positions of the mask or base sheet and the original picture sheet.

It is however considerably difficult as a matter of fact to automatically fit unprocessed sheets, through which positioning holes have been formed in advance, on a pinned bar of a coordinate plotter, because the fitting tolerance between the positioning holes and pins is designed to be extremely small so as to assure the accuracy of positioning, of the sheet. It is hence necessary to position the sheets exactly when fitting the sheets on the pins, and the feeder must thus be constructed with an extremely high level of accuracy. Accordingly, it is impractical to fit such unprocessed sheets on such a pinned bar.

As a matter of fact, the positioning and removal of each sheet is thus effected manually. However, it is obviously desirous to effect the replacement work of sheets without need for operators if one wants to impart some automatic controlling function to a coordinate plotter with a view toward achieving unattended operation.

Regarding such automatic sheet replacement means, the present assignee has already proposed to use means disclosed in the specification of Japanese patent application No. 102369/1982 entitled "AUTOMATIC FEEDING AND EJECTING DEVICE FOR SHEETS". Practically speaking, it is however impossible to accomplish accurate positioning of such sheets as mentioned above.

By the way, the principal objective of formation of positioning holes through sheets is to facilitate the positioning of the sheets in subsequent steps, for example, to superpose and align a multi-exposing mask, fabricated by a coordinate plotter, with a picture film or to determine the relative position of a patching and laying-out base sheet for each color-separated printing plate. It is generally unnecessary to position an unprocessed sheet exactly when drawing a picture on the unprocessed sheet by means of a coordinate plotter.

Positioning holes may be successfully used also for positioning the sheet in subsequent steps if the positioning holes are formed with predetermined positional relationship relative to a completed picture pattern in a drawing work making use of a coordinate plotter. For this purpose, it is only necessary to form the positioning holes while holding the sheet in place on a table of the coordinate plotter when drawing the desired picture pattern at a predetermined position of the sheet laid on the table.

On the other hand, the present assignee has already filed a Japanese patent application on an apparatus for automatically feeding and ejecting sheets to and from a coordinate plotter or the like (Japanese patent application No. 102369/1982). However, there has recently been proposed a coordinate plotter in which a puncher is provided on a fixed frame adapted to guide a table so that the puncher can form holes through a sheet supplied to the table in order to facilitate the positioning of the sheet in the subsequent step. If an automatic sheet feeding and ejecting apparatus, such as that mentioned above, is combined as is with the above-proposed coordinate plotter, the resulting system will encounter such a problem as will be mentioned next. Namely, a suction device moves in the feeding and ejecting apparatus so as to suck up a sheet for its conveyance. This movement of the suction device will however be interfered by the puncher, whereby failing to convey the sheet to a desired position.

The above problem has become more serious in the case of such a puncher-equipped coordinate plotter as described above, because the puncher-equipped coordinate plotter is required to feed each sheet over an extra distance compared with previous coordinate plotters having no punchers so as to insert the sheet into the puncher.

It may be contemplated to suck each sheet at a point somewhat apart from its leading edge in order to avoid the above-mentioned problem. If the sucked point of the sheet is too far from its leading edge, the leading edge portion of the sheet will, hang down and insertion of the sheet into the puncher will thus be rendered more difficult.

As a countermeasure against the above-mentioned problem, it may also be contemplated to provide additional mechanical insertion means. This will however lead to another drawback that the coordinate plotter will be rendered more complex and more costly.

SUMMARY OF THE INVENTION

The overall object of this invention is to provide a coordinate plotter with an automatic punching device, which plotter has overcome such drawbacks or problems as mentioned above, as well as a method and apparatus for feeding sheets to the coordinate plotter.

The first object of this invention is to provide a coordinate plotter equipped with an automatic punching device, which plotter permits formation of positioning holes through a sheet with desired mutual intervals and with desired distances from an origin, whereby holding the sheet at a predetermined position on the table of the coordinate plotter.

The second object of this invention is to provide a method for feeding sheets to a coordinate plotter without developing the above-described conventional drawbacks or problems, and an apparatus for practicing the method.

In one aspect of this invention, there is thus provided a coordinate plotter with at least one automatic punching device, which plotter is adapted to draw a desired picture by shifting a table and an autographic head directed downwardly from a point right above the table in the X-axis and Y-axis directions respectively. The at least one automatic punching device is provided adjacent to a side edge parallel to the moving direction of the table and at a height equal to the upper surface of the table so as to form a positioning hole through a sheet laid on the table for drawing the desired picture thereon.

In another aspect of this invention, there is also provided a method for feeding sheets one by one from a tray, in which said sheets are stored, to a table of a coordinate plotter, which method comprises:

sucking up one of the sheets from the tray and conveying the sheet to a suitable position on the table by means of a suction device which is displaceable between the tray and table;

stopping the suction and placing the sheet temporarily, at a suitable position;

causing only the suction device to retreat over a predetermined distance; and causing the suction device to suck the sheet again and conveying the sheet to a predetermined final position on the table.

In a further aspect of this invention, there is also provided an apparatus for feeding sheets to a coordinate plotter, which apparatus comprises:

a suction device provided displaceably between a tray, in which the sheets are stored, and a table of the coordinate plotter, said suction device being capable of sucking one of the sheets thereon;

drive means for moving the suction device reciprocally between the tray and the table;

first detection means for detecting that the suction device has reached a temporary-placing position on the table, thereby stopping the suction of the sheet by the suction device and at the same time actuating the drive means so as to, withdraw the suction device; and second detection means for detecting that the suction device has, withdrawn exactly over a predetermined distance from the temporary-placing position, thereby resuming the suction of the sheet by the suction device and at the same time actuating the drive means to cause the suction device to advance again.

The coordinate plotter with the automatic punching device, the feeding method and the feeding apparatus, all of which pertains to the present invention, can overcome the above-mentioned problems or drawbacks of their corresponding prior art techniques. The above and other objects, features and advantages of the present invention will become more apparent from the following description and the appended claims, taken in conjunction with the accompanying drawings.

BRIEF DESCRIPTION OF THE DRAWINGS

In the accompanying drawings:

FIG. 6 is a simplified front elevation showing an unprocessed sheet sucked on a suction device;

FIG. 7 is a simplified front elevation illustrating the unprocessed sheet fed to a position right above the puncher-equipped coordinate plotter;

FIG. 8 is a simplified front elevation depicting the unprocessed sheet placed temporarily on the puncher-equipped coordinate plotter and the suction device withdrawn solely subsequent to the temporary positioning of the unprocessed sheet;

FIG. 9 shows as a simplified front elevation the unprocessed sheet sucked again on the suction device and then inserted into the punchers;

FIG. 10 is a simplified front elevation illustrating the processed sheet sucked up from the table of the coordinate plotter; and FIG. 11 shows as a simplified front elevation the processed sheet conveyed into a tray for processed sheets.

DETAILED DESCRIPTION OF THE INVENTION AND PREFERRED EMBODIMENT

The invention will hereinafter be described specifically with reference to the accompanying drawings.

Figure 1:
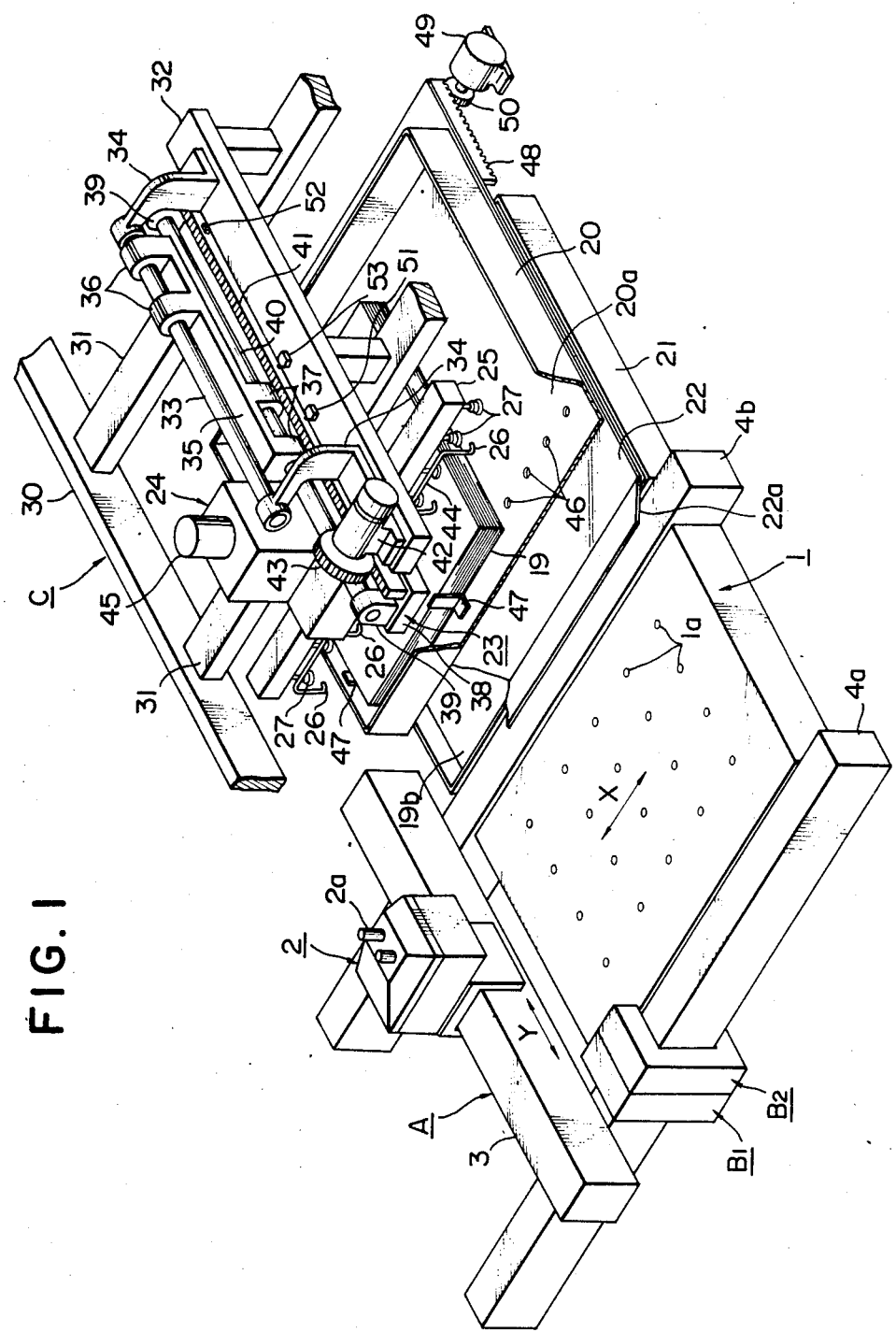
FIG. 1 is a perspective view of a puncher-equipped coordinate plotter according to one embodiment of this invention.
Figure 2:
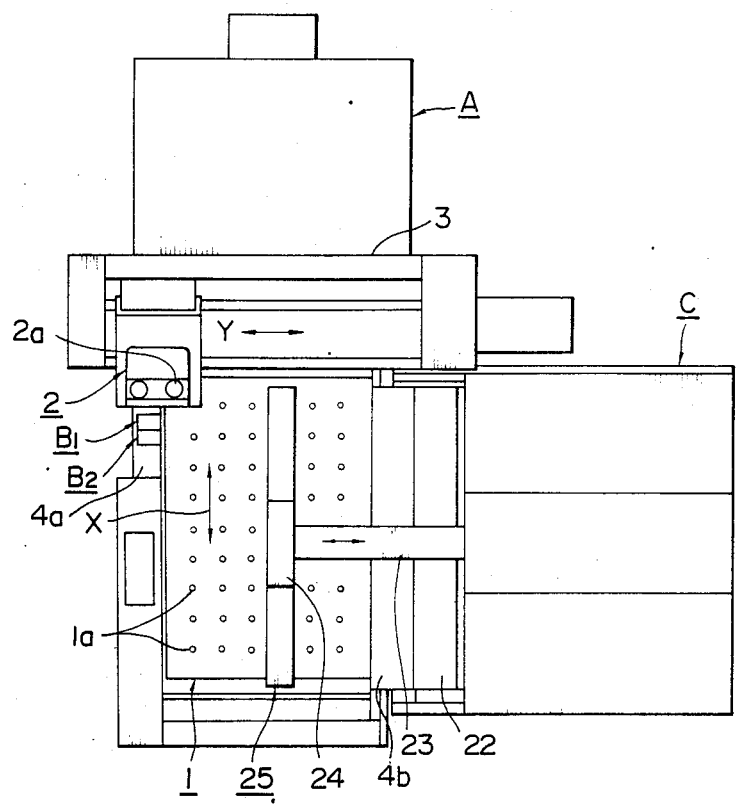
FIG. 2 is a simplified top plan view of the puncher-equipped coordinate plotter of FIG. 1.
Figure 3:
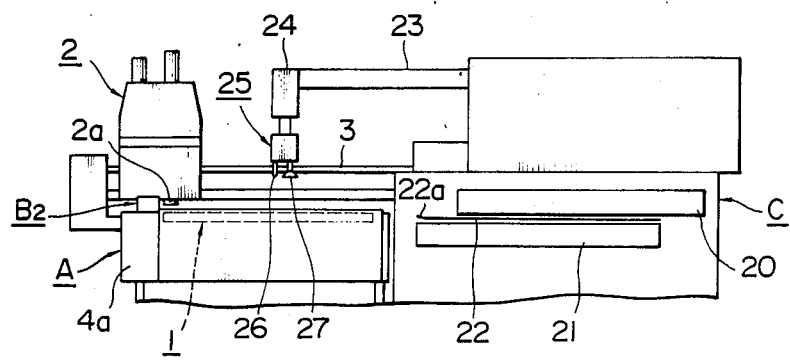
FIG. 3 is a simplified fragmentary front elevation of the puncher-equipped coordinate plotter of FIG. 1.

In FIG. 1 through FIG. 3, there are illustrated the main body A of a coordinate plotter, a plate-like hollow table 1, and an autographic head 2. By an unillustrated electronic control system, the table 1 is caused to move in the X-direction (namely, in the back and forth direction in the drawing) along X-axis frames 4a,4b whereas the autographic head 2 is caused to move in the Y-direction (namely, in the left to right and right to left direction in the drawing) along a Y-axis frame 3, so that a desired picture may be drawn on a sheet such as photo-sensitive sheet laid on the table 1 by an exposure device 2a or the like mounted as pen means such as ruling pen on the autographic head 2 as will be described herein.

A number of air sucking and blowing holes 1a are formed through the top wall of the table, which holes 1a are connected to an air sucking and blowing device (not shown).

In FIG. 2 and FIG. 3, the table 1 has moved to its front limit while the autographic head 2 has moved to its lefthand limit and assumes, for example, the origin of the coordinate.

On the lefthand X-axis frame 4a provided at the lefthand edge of the upper wall of the main body A of the coordinate plotter, first and second punchers B1,B2 are provided in a pair and side by side in a back and forth relation along the X-axis at locations somewhat ahead of the Y-axis frame 3.

Figure 4:
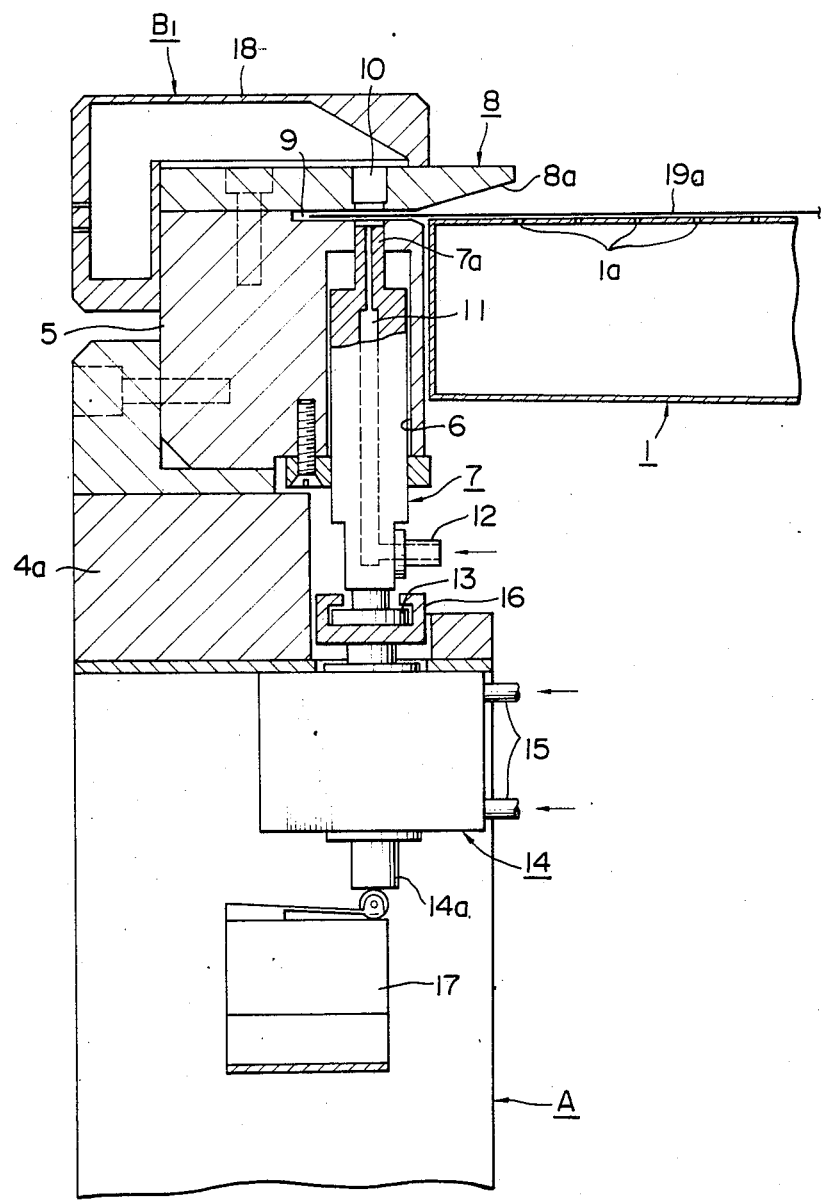
FIG. 4 shows in a vertical cross-section one of the punchers provided with the coordinate plotter of FIG. 1.

FIG. 4 shows a vertical cross-section of the first automatic puncher B1. A punching table 5 is fixedly mounted on a suitable position of the lefthand X-axis frame 4a of the main body A of the coordinate plotter, with its principal upper surface located at the same height as the table 1. In a guide bore 6 formed upright through an inner edge portion of the punching table 5 which inner edge portion lies adjacent to the table 1, there is internally fit a punch 7 having an upwardly-directed cutting edge 7a adapted to form holes.

A lefthand portion of the lower wall of, a die 8 is fixed on the upper wall of the punching table 5. A clearance 9 is formed above the upper surface of the table 1 and between a righthand portion of the upper wall of the punching table 5 and the facing edge portion of the lower wall of the die 8.

The lower wall of the die 8 is formed at a location adjacent to the lefthand edge of the table 1 into a sheet guide surface 8a which extends inwardly and upwardly toward the center of the table 1.

Along the vertical axis of the punch 7, there is formed an air jet hole 11 which opens at its upper extremity toward a die hole 10. A compression air source (unillustrated) is connected to an air supply tube which in turn communicates to the lower extremity of the air jet hole 11.

A horizontal coupling flange 13 is continually provided at the lower extremity of the punch 7. Underneath the coupling flange 13, a short air cylinder 14, the actuation axis of which extends in the vertical direction, is fixedly provided as an actuator for the punch 7.

Numeral 15 indicates an air supply tube connected to the unillustrated compression air source in order to actuate the piston of the air cylinder 14 up and down. A metallic coupler 16 provided to the upper extremity of a piston rod 14a, which extends through the air cylinder 14, is kept in engagement with the coupling flange 13 of the punch 7, while the lower extremity of the piston rod 14a is in contact with a microswitch 17 which serves to detect the completion of formation of each hole.

An ejection chamber 18, which is in communication with the die hole 10 for removal of punched-out chips, is provided on the upper wall of the die 8.

Numeral 19a indicates an unprocessed sheet which has been conveyed onto the table 1 for drawing a desired picture thereon and as will be described herein, has been inserted into the clearance 9.

Designated at letter C is an automatic sheet conveyor provided rightwardly adjacent to the main body A of the coordinate plotter. There are also illustrated a tray 20 holding a number of unprocessed sheets 19 stored therein and another tray 21 for receiving and storing processed sheets. The upper face of the tray 21 is closed by a light-shielding plate 22 which serves also as a sheet guide plate and can be opened to the right. The member 22 is called the light-shielding plate for the sake of convenience in describing it in an embodiment in which photosensitive sheets are used as the sheets 19. When usual paper sheets are employed, the member 22 serves merely as a sheet guide plate.

Above the central portion of the tray 20 for unprocessed sheets in the automatic sheet conveyor C, there is axially provided an expansion arm 23 extending in the right-to-left direction displaceably in the Y-axis direction of the main body A of the coordinate plotter, namely, in the right-to-left and left-to-right direction by means of a rack and pinion drive unit which is illustrated in FIG. 1 and will be described herein. A suction device 24 is attached to the lefthand extremity of the expansion arm 23. A number of air-blowing nozzles 26 and suction cups 27, which will be described herein, are suspended movably up and down from the suction head 25.

The operation of the above coordinate plotter will next be described.

The suction device 25 held in such a state as shown in FIG. 2 comes down at a point near the left edge of the unprocessed sheets 19 in the tray 20 by means of the suction device 24 and a drive unit which will be described herein. Then, it sucks up the uppermost sheet 19a by its suction cups 27 (see, FIG. 6).

Thereafter, the suction head 25 ascends to its upper limit while blowing air through the nozzles 26 and then moves leftwards together with the expansion arm 23 to a first preset point which is located near and above the lefthand edge of the table 1. The suction head 25 moves downwardly until the thus-sucked sheet 19a comes down very close to the table 1. After temporarily placing the sheet 19a on the table 1, the suction head 25 retreats back to a second preset point. The suction head 25 sucks up the unprocessed sheet 19a again at the second preset point and then advances somewhat leftwards.

In the course of the above operation, the unprocessed sheet 19a is readily separated as a single sheet from the remaininig unprocessed sheets in the tray 20 owing to the air blown out through the nozzles 26 and at the same time is supported afloat by an air stream formed of the blown-out air during its conveyance. Therefore, the unprocessed sheet 19a is not damaged due to its contact with the frame of the tray 21 for unprocessed sheets or other members.

Figure 5:
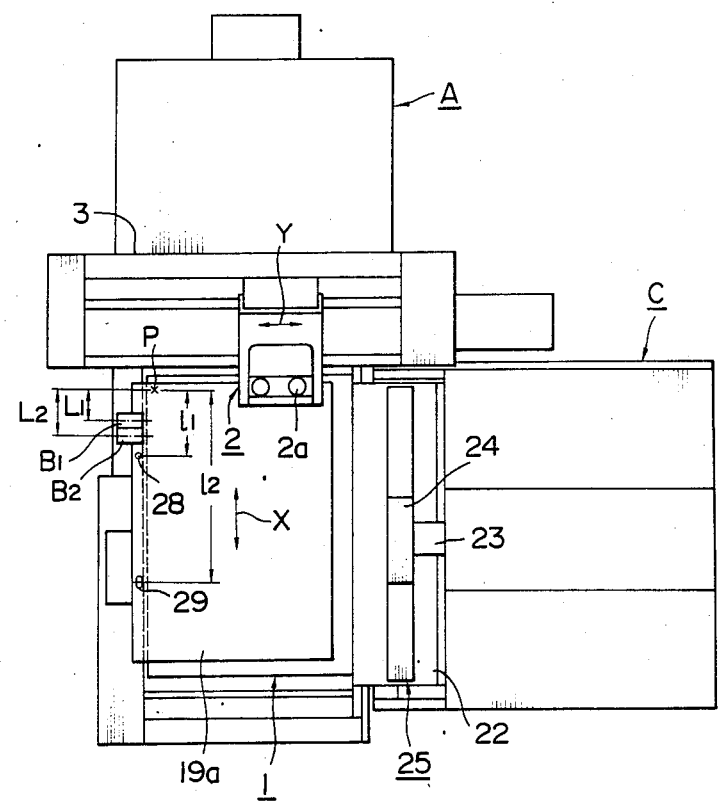
FIG. 5 is a simplified top plan view of the puncher-equipped coordinate plotter of FIG. 1, in which an unprocessed sheet has been inserted into the punchers.

The thus-conveyed sheet 19a is, as depicted in FIG. 4 and FIG. 5, guided at its lefthand edge by the sheet-guiding surfaces 8a of dies of both automatic punchers B1,B2 and is then inserted into the clearance 9.

Thereafter, the suction cups 27 stop sucking air and the released sheet 19a is then sucked on the table 1 owing to suction of air through the air sucking and blowing holes 1a. The expansion arm 23 then retreats from the point above the table 1.

The above conveyance of the sheet 19a is automatically performed in its entirety by the electronic control system.

The table 1 is then controlled by the electronic control system to move back over a predetermined distance $l_1 - L_1$ from an origin P of drawing and to stop there. Here, the air cylinder 14 of the first automatic puncher B1 is actuated upwardly to allow the punch 7 to project upwardly, whereby punching out a first positioning hole 28 through an edge portion of the sheet 19a.

After completion of the formation of the hole 28, the piston rod 14a is caused to move downwardly. This downward movement of the piston rod 14a is detected by the microswitch 17, thereby to move back the table 1 over another predetermined distance $l_2 - L_2$ from the origin P. Then, the second automatic puncher B2 bores a second positioning hole 29 through the edge portion of the sheet 19a.

Chips punched out from both positioning holes 28,29 are removed via the ejection chamber 18 owing to the air jetted out through the punch 7.

By the way, the distance $l_1$ is a distance of a point, where the formation of a hole by the first automatic puncher B1 is required, from the origin P. Similarly, the distance $l_2$ is a distance of another point, where the formation of an additional hole by the second automatic puncher B2 is required, from the origin P. On the other hand, the distances $L_1$ and $L_2$ are offset distances of the centers of the first and second automatic punchers B1,B2 from the origin P respectively.

The first automatic puncher B1 forms, true circular holes. On the other hand, the second automatic puncher B2 bores somewhat elongated holes each of which has the same dimension as the hole diameter punched out by the first automatic puncher B1 in the Y-direction but in the X-direction, a dimension somewhat longer than the diameter of the hole punched out by the first automatic puncher B1. When it is desired to form both holes as, true circular holes, it is necessary to form both holes by the first automatic puncher B1.

After forming the positioning holes in the above manner, the main body A of the coordinate plotter draws a desired picture on the sheet 19a placed on the table 1 in accordance with a command from the electronic control system.

After completion of the drawing work, the table 1 and head 2 return again to their respective positions shown in FIG. 1. Thus, the processed sheet 19a is removed from the table 1 and is then subjected to a development treatment. Alternatively, the automatic conveyor C is actuated in an order opposite to its feeding mode to store the processed sheet 19a in the tray 21 for processed sheets 19a.

In the coordinate plotter of this invention, positioning holes are formed through the sheet 19a by a command from the electronic control system after holding, in accordance with preset data on the distances $l_1$ and $l_2$ on the basis of the origin P, the sheet 19a in place in a state ready for drawing a desired picture thereon as described above. Therefore, the relative positional relationship between the positioning holes 28,29 of the sheet 19a and the desired picture remains unchanged even if the sheet 19a is somewhat misplaced on the table 1, so long as the input data on $l_1$ or $l_2$ pertaining to the locations of the positioning holes are not altered. Therefore, unlike conventional methods, no errors exceeding the positioning accuracy of the table 1 will occur by the formation of the positioning holes 28,29, for example, between main pictures drawn on separately-processed two sheets 19,19 and a mask image pertaining to the main pictures.

If one wants to change the interval between the positioning holes 28 and 29 in view of the size of the sheet 19 or the like, it is possible to obtain desired intervals continuously with an accuracy equal to the resolution of the main body A of the coordinate plotter by altering the input data on $l_1$ and $l_2$. It is thus unnecessary, different from conventional methods, to keep a number of puncher-pinned bar sets corresponding to individual pitches of positioning holes.

If one wants to form the positioning holes 28,29 for example into a circular hole and elliptical hole, it is only necessary to form the punches 7 and dies 8 into shapes conforming respectively with the circular hole and elliptical hole.

If it is required to form a plurality of positioning holes having the same shape, these positioning holes may be formed with predetermined intervals through the sheet 19 by only one puncher provided that the table 1 is shifted. It is also feasible not only to change the shapes of holes but also to form positioning holes having different diameters.

In the coordinate plotter according to this invention, the input of various setting-up data to the electronic control system has to be done by operators. However, the drawing work may be carried out in accordance with the thus-preset data on desired pictures without need for attendance of operators, when a sheet-conveying method which will be described herein is used in combination with the coordinate plotter. Namely, the present invention also provides an unmanned apparatus capable of feeding a number of sheets automatically one after another and also capable of storing automatically processed sheets bearing pictures drawn thereon.

Referring again to FIG. 1, the sheet conveyor C of this invention which is arranged in adjacent to the right-hand side wall of the main unit A of the coordinate plotter includes fixed structural frames 30 (the front structural frame is omitted) extending the left-to-right direction. On support bars 31 which extend between the structural frames 30, there is supported a support plate 32 extending in the left-to-right direction.

A first spline shaft 33 which extends in the left-to-right direction is mounted above a rear edge portion of the support plate 32 by means of metallic support arms 34,34.

Bearings 36,36 provided fixedly on the upper right surface of a first slide plate 35, which extends in the left-to-right direction underneath the first spline shaft 33, are slidably fit over the first spline shaft 33. On the other hand, a second spline shaft 40 attached by metallic supports 39,39 to both upper end portions of a second slide plate 38 extending in the left-to-right direction underneath the first slide plate 35 is slidably inserted through bearings 37,37 suspended from the lower left-hand surface of the first slide plate 35.

On the upper front surface of the second slide plate 38, a lack 41 parallel to the second spline shaft 40 is fixed. The lack 41 is kept in meshing engagement with a pinion 43 of a motor 42 mounted on the upper left surface of the support plate 32. Therefore, the second slide plate 38 moves in the left-to-right and right-to-left direction with a stroke close to its overall length without turning about its longitudinal axis at each sliding part. Thus, the first and second slide plates 35,38 are allowed to undergo an expansion and shrinkage motion.

The suction device 24 is provided at a left end portion of the second slide plate 38. The suction head 25 and an air-supply tube 44 positioned at the lefthand side of the suction head 25, which are both provided on the lower surface of the suction device 24 and extend in the front-to-rear direction, are simultaneously raised or lowered by a motor 45 mounted on the top wall of the suction device 24.

On the lower surface of the suction head 25, there are provided the number of suction cups 27 aligned in a row in the front-to-rear direction. The air supply tube 44 is provided with the number of air-blowing nozzles 26 which extends in a row in the front-to-rear direction, are bent in the lower right direction and have their free ends located leftwards the suction cups 27 and at the same height as the suction cups 27.

The suction cups 27 are connected, as will be described herein, respectively to a vacuum source (not illustrated) by way of their corresponding solenoid valves (not shown) which close the suction cups 27 one after another from the front to the rear in accordance with a control of a constant-pressure switch (not illustrated) provided at a suitable point in an air evacuation system.

Underneath the suction device 24, there are provided the upwardly-opening tray 20 adapted to receive a number of unprocessed sheets 19, such as photosensitive sheets, peel-off sheets or Kent paper sheets, in a stacked state and the tray 21 having substantially the same dimensions and configurations with the tray 20, positioned at a lower right location relative to the tray 20 and adapted to store processed sheets 19b. Both trays 20,21 may be pulled out frontwards when placing additional unprocessed sheets or taking out processed sheets.

Air holes 46 having a function which will be described herein are formed through the bottom wall 20a of the tray 20 for unprocessed sheets at locations right underneath the suction cups 27. On the left frame and rear frame, stoppers 47,47 are provided to determine the positions of the unprocessed sheets 19. Owing to the provision of the stoppers 47,47, the left edges of the unprocessed sheets 19 are positioned at a suitable location underneath the suction cups 27. The upper opening of the tray 21 is normally covered by the light-shielding plate 22 which extends upwardly and leftwardly at its lefthand edge portion so as to form the sheet-guiding edge 22a.

A pair of lacks 48 provided on the lower right surface of the light-shielding plate 22 at both front and rear portions thereof and extending in the left-to-right direction (the rear lack is omitted) are kept in meshing engagement with pinions 50 (the rear pinion is omitted) of motors 49 (the rear motor is omitted). Accordingly, the light-shielding plate 22 is shifted leftwards or rightwards by the motors 49.

Designated at numeral 51 is a limit switch which serves as a first detection device. The limit switch 51 is provided on the support plate 32 and is brought into contact with a dog 52 formed on the front surface of the lack 41 for its actuation when the suction device 24 has reached a preset temporarily-placing position, i.e., a preset first position. Thus, the limit switch 51 actuates the solenoid valves so as to stop the suction of each suction cup 27 of the suction device 24 and at the same time to stop the blowing of air through each of the the nozzles 26. Simultaneously, the limit switch 51 reverses the motor 42.

Numeral 53 indicates another limit switch which serves as a second detection device. The limit switch 53 is provided on the support plate 32 with a predetermined distance apart from the above-mentioned limit switch 51. The limit switch 53 is brought into contact with the dog 52 when the suction device 24 has retreated to a second position apart leftwardly over a predetermined distance from the temporarily-placing position, i.e., the first position, so that the limit switch 53 is turned on to actuate the solenoid valves for resumption of suction by the suction cups 27 of the suction device 24 and at the same time to drive the motor in the normal direction.

By the way, it is preferred to mount these limit switches 51,53 in an adjustable fashion on the support plate 32.

Besides, various detection devices and sensors are also provided to control the operations of the motors 42,45,49 and the like so that the coordinate plotter is operated as a whole in a below-described manner. Detailed description on these obvious matter is however omitted herein.

Next, the method of this invention will be described together with the operation of the above-described coordinate plotter.

Figure 6:
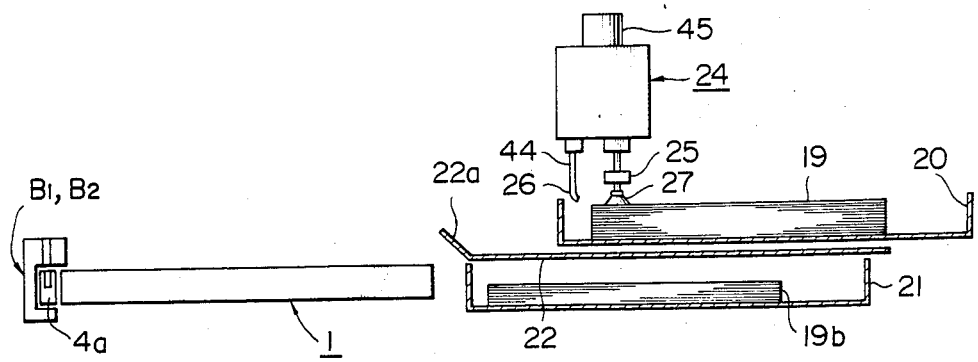
FIG. 6 through FIG. 11 are schematic illustrations for describing the sheet-feeding method of this invention, namely.

As illustrated in FIG. 6, the suction head 25 and air supply tube 44 are lowered by the motor 24 from their positions right before the initiation of the conveying step, namely from their positions depicted in FIG. 1 so as to bring the suction cups 27 into contact with the lefthand edge portion of the upper surface of the unprocessed sheet 19 for starting the suction of the unprocessed sheet 19.

Here, the level of vacuum does not increases if the front-to-rear dimension, i.e., the width of the unprocessed sheet 19 is relatively small and some front suction cups 27 are outside the unprocessed sheet 19. This situation is then detected by a constant-pressure switch provided at a suitable location in the air evacuation system for the detection of air pressure, whereby to close the solenoid valves corresponding to the suction cups 21, which suck lots of air, sequentially one after another from the frontmost solenoid valve and to stop the suction of air through such suction cups 21. This permits suction of the unprocessed sheet 19 only by suction cups 27 which are in contact with the unprocessed sheet 19.

Air holes 46 formed through the bottom wall of the tray 20 for unprocessed sheets serve to avoid an apparent increase in vacuum level, which apparent increase occurs when the tray 20 contains a relative small number of unprocessed sheets 19 and the suction cups 27, which have not been brought into contact with the uppermost unprocessed sheet 19 when they are lowered, suck directly on the bottom wall 20a of the tray 20 for unprocessed sheets. By the way, it may be possible to determine the sheet-sucking zone of the table 1 of the coordinate plotter automatically in association with the setting-up of the sucking positions of the suction cups.

When the vacuum level of the suction head 25 has increased and the unprocessed sheet 19a has been surely sucked, air is blown from the number of air-blowing nozzles 26 provided on the air supply tube 44 toward the stacked many unprocessed sheets 19. At the same time, the motor 45 is reversed to lift the suction device 24. This causes only the uppermost unprocessed sheet 19 to ascend, thereby allowing to blow air against the lower surface of the sheet 19. Therefore, only the uppermost sheet is lifted.

Figure 7:
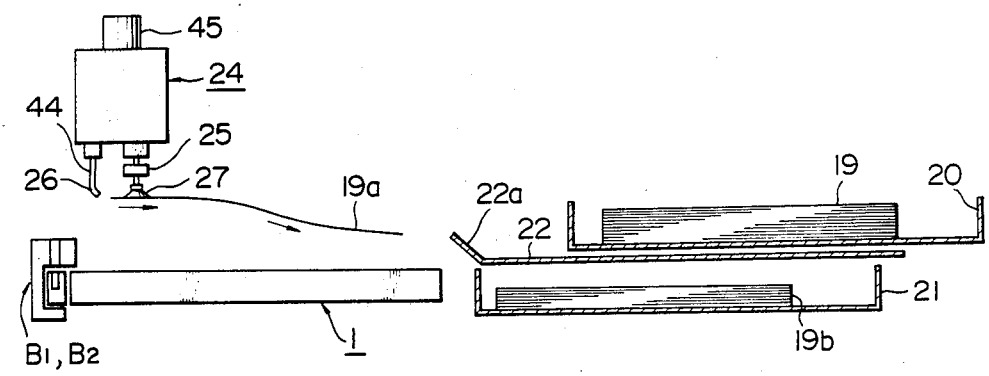

As illustrated in FIG. 7, the motor 42 is then driven to expand the expansion arm 23, whereby causing the suction device 24 to advance to a position near and above the left edge of the table 1 of the main unit A of the coordinate plotter, in other words, to such a position where the left edge of the unprocessed sheet 19a does not contact the punchers B1,B2 even when the suction device 24 descends. In the course of this leftward conveyance, the unprocessed sheet 19a is carried to the point above the table 1 while held substantially in the horizontal position owing to air streams jetted out through the nozzles 26. When the suction device 24 reaches the above mentioned temporarily-placing position, namely, the first position, the limit switch 51 is actuated to lower the suction device 25 and air supply tube 44 so that the unprocessed sheet 19a is placed temporarily on the table 1.

Figure 8:
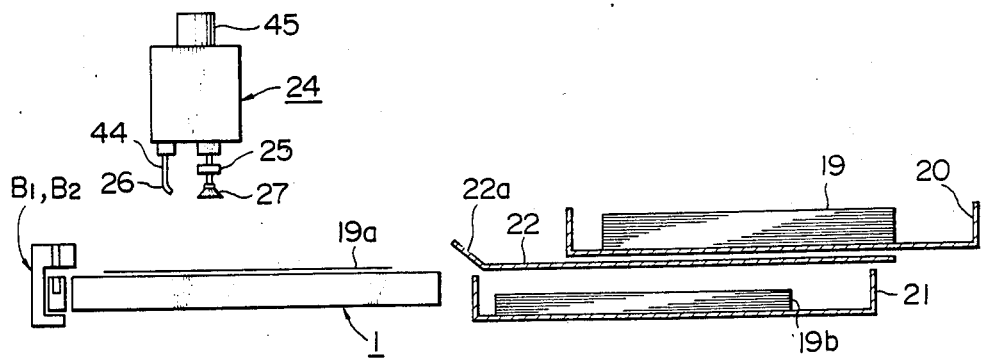

Either simultaneously with or subsequent to the above temporary placing of the unprocessed sheet 19a on the table, the motor 45 is reversed to raise the suction device 24 and at the same time the motor 42 is also reversed to retreat only the suction device 24 back to the second position shown in FIG. 8.

This distance of retreat is determined by adjusting the mounting positions of the limit switches 51,53 on the basis of the position of the leading edge of the unprocessed sheet 19a in its temporarily-placed state and the final target position of the leading edge of the unprocessed sheet 19a after advancement of the sale leading edge into the clearances 9 of the punchers B1,B2.

Figure 9:
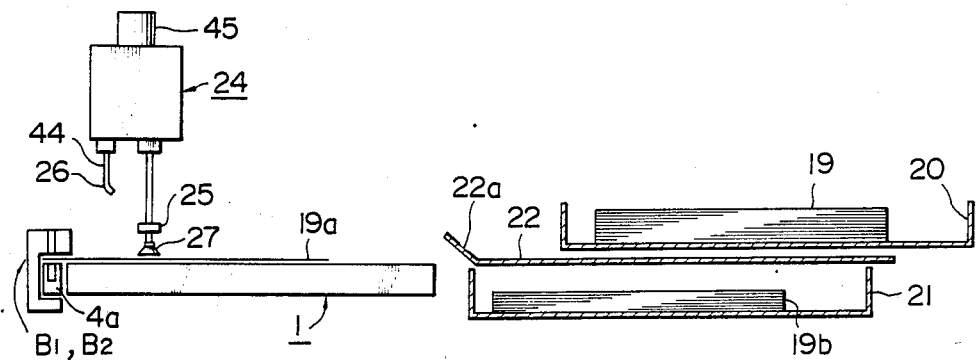

When the suction device 24 retreats over the above-mentioned distance to actuate the limit switch 53, the suction head 25 is solely allowed to descend as shown in FIG. 9 and to suck the next unprocessed sheet 19a again. While holding the thus-sucked unprocessed sheet 19a, the suction device 24 advances over a distance equal to the distance of retreat so as to cause the unprocessed sheet 19a to advance along the table 1 until the leading edge of the unprocessed sheet 19a enters the punchers B1,B2.

When the unprocessed sheet 19a has reached the above-mentioned final target position, this is detected for example by either one of the above-mentioned limit switch, say, by the limit switch 51 so that the suction of the suction cups 27 is stopped and the suction head 25 is lifted. At the same time, the motor 42 is reversed and the expansion arm 23 is shrunk so that the suction device 24 is caused to retreat to the initial position. At this time, the unprocessed sheet 19a placed on the table 1 is sucked under vacuum by the air sucking and blowing holes 1a so that the unprocessed sheet 19a is fixed firmly on the table 1.

Then, the main unit A of the coordinate plotter is actuated to shift the table 1 back and forth so that positioning holes, which are useful for apparatus to be used in subsequent steps, are formed through an edge portion of the unprocessed sheet 19a at suitable points by the puncher B1 or B2 as mentioned above. In addition, a desired picture is drawn, making use of the principal function of the coordinate plotter, on the unprocessed sheet 19a by the exposure device 2a of the head 2 in a manner known per se in the art.

Figure 10:
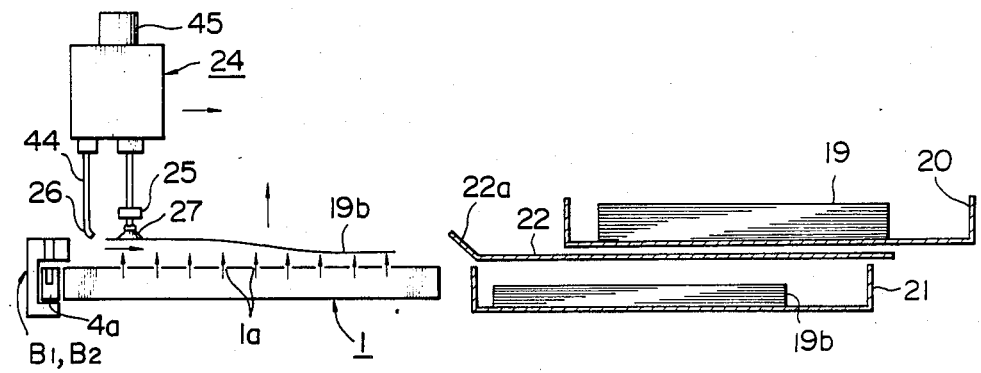

Upon completion of the drawing work, the suction device 24 moves, as illustrated in FIG. 10, to a position leftwardly above the processed sheet 19b on the table 1 while operated in a manner substantially opposite to that described above with reference to FIG. 6 to FIG. 9. Thus, the suction head 25 and air supply tube 44 descend to start suction and blowing of air respectively. At this time point, each suction cup 27 is actuated in the same manner as in the feeding stroke of the unprocessed sheet 19a. Thus, the sheet 19b may be readily separated from the table 1 and allowed to float over the table 1 by jetting air out through the air sucking and blowing holes 1a of the table 1 and lifting the suction device 24 slightly.

Figure 11:
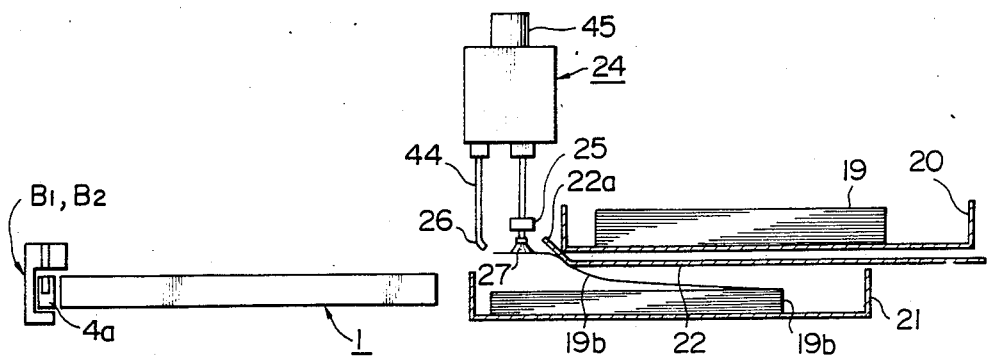

Then, the suction device 24 advances rightward as shown in FIG. 11. The motor 49 is at the same time actuated to shift the light-shielding plate 22 rightward. This allows the left portion of the tray 21 for processed sheets 21, thereby allowing the processed sheet 19b to advance rightward while kept afloat as shown in FIG. 10. Accordingly, the processed sheet 19b is guided by the sheet-guiding edge 22a of the light-shielding plate 22 and is then received in the tray 21 for processed sheets.

When the suction device 24 is stopped at a predetermined position and the sucking and feeding of air are stopped, the processed sheet 19b is allowed to drop into the tray 21 for processed sheets. Thus, the processed sheet 19b is stored there. Thereafter, the motors 49 are actuated to move the light-shielding plate 22 leftwards.

As apparent from the above description, the combined use of the automatic sheet conveyor, which is useful for the practice of the sheet-conveying method of this invention, with the punch-equipped coordinate plotter A in accordance with the present invention does not require to use a large automatic sheet feeding and ejecting apparatus and permits insertion of leading edge portions of unprocessed sheets into punchers without failure, because according to the present invention each unprocessed sheet is placed temporarily on the table of the resulting puncher-equipped coordinate plotter, the suction device is solely retreated, and the suction device sucks again the unprocessed sheet and causes the unprocessed sheet to advance along the table so as to set the leading edge portion of the unprocessed sheet in the punchers.

In addition, the present invention conveniently permits use of the above-mentioned apparatus, which constitutes the subject matter of the above-mentioned pending Japanese patent application, without need for any substantial modifications.

From the above results, it is possible to economically and efficiently practice the combined use of the automatic sheet conveyor with the puncher-equipped coordinate plotter in accordance with the present invention.

By the way, the suction device is allowed to retreat only once in the above Example. It is of course possible to design the suction device in such a way that it repeats retreat and/or advance several times for conveying a sheet.

In the backward stroke in which each processed sheet 19b is conveyed back to the tray 21 for processed sheets, the processed sheet 19b may be conveyed directly and straightforward without performing such two-step feeding as practiced in the frontward stroke.

Having now fully described the invention, it will be apparent to one of ordinary skill in the art that many changes and modifications can be made thereto without departing from the spirit or scope of the invention as set forth herein.

What is claimed is:

1. An apparatus for feeding sheets to a coordinate plotter, comprising:
    a suction device provided displaceably between a tray, in which the sheets are stored, and a table of the coordinate plotter, said suction device being capable of sucking one of the sheets thereon;
    drive means for moving the suction device reciprocally between the tray and the table;
    first detection means for detecting that the suction device has reached a temporarily-placing position on the table, thereby stopping the suction of the sheet by the suction device and at the same time actuating the drive means so as to retreat the suction device; and
    second detection means for detecting that the suction device has retreated exactly over a predetermined distance from the temporarily-placing position, thereby resuming the suction of the sheet by the suction device and at the same time actuating the drive means to cause the suction device to advance again.

2. An apparatus according to claim 1, wherein the suction device is equipped with a suction cup connected to a vacuum source by way of a solenoid valve and an air-feeding tube connected to an air source by way of a solenoid valve and adapted to blow air to a point underneath the sheet sucked on the suction cup.

* * * * *